US010140289B2

(12) United States Patent
Chew (10) Patent No.: US 10,140,289 B2
(45) Date of Patent: Nov. 27, 2018

(54) IDENTIFYING PROPAGANDA IN GLOBAL SOCIAL MEDIA

(71) Applicant: Peter Alexander Chew, Albuquerque, NM (US)

(72) Inventor: Peter Alexander Chew, Albuquerque, NM (US)

(73) Assignee: Galisteo Consulting Group, Inc., Albuquerque, NM (US)

( * ) Notice: Subject to any disclaimer, the term of this patent is extended or adjusted under 35 U.S.C. 154(b) by 140 days.

(21) Appl. No.: 15/472,697

(22) Filed: Mar. 29, 2017

(65) Prior Publication Data

US 2018/0285342 A1    Oct. 4, 2018

(51) Int. Cl.
G06F 17/27    (2006.01)
G06F 17/30    (2006.01)

(52) U.S. Cl.
CPC ........ *G06F 17/2785* (2013.01); *G06F 17/277* (2013.01); *G06F 17/30011* (2013.01)

(58) Field of Classification Search
CPC ...................................................... G06F 17/27
See application file for complete search history.

(56) References Cited

U.S. PATENT DOCUMENTS

| 7,558,774 | B1 * | 7/2009 | Nakano | G06F 17/30675 706/52 |
| 8,290,961 | B2 | 10/2012 | Chew et al. | |
| 8,296,168 | B2 * | 10/2012 | Subrahmanian | G06F 17/275 705/7.11 |
| 8,738,354 | B2 * | 5/2014 | Platt | G06F 17/28 704/2 |
| 9,471,883 | B2 * | 10/2016 | Chatterjee | G06N 99/005 |
| 2006/0190241 | A1 * | 8/2006 | Goutte | G06F 17/2827 704/2 |
| 2006/0265209 | A1 * | 11/2006 | Bradford | G06F 17/2809 704/9 |

(Continued)

OTHER PUBLICATIONS

Chew et al., "Cross-Language Information Retrieval Using PARAFAC2", acm, 2007.*

(Continued)

*Primary Examiner* — Annie L Thomas-Homescu (57) ABSTRACT

Disclosed is a scalable method for automatically deriving the topics discussed most prevalently in unstructured, multilingual text, and simultaneously revealing which topics are more biased towards one or another 'information space'. The concept of the 'information space' is derived from Russian strategic doctrine on information warfare; an example of an 'information space' would be the portion of social media in which the Russian language is used. The disclosed method leverages this concept, in conjunction with unsupervised multilingual machine learning, to determine, automatically and without any built-in bias or preconceived notions of what is important, which topics are more discussed, for example, in one language than another. An analyst's attention can then be focused on the most important differences between national discourses, and insight more quickly gained into the areas (both topics and geographic regions) in which propaganda of the sort envisaged in Russian strategic doctrine may be taking hold.

20 Claims, 5 Drawing Sheets

(56) References Cited

U.S. PATENT DOCUMENTS

| | | | |
|---|---|---|---|
| 2010/0185685 A1* | 7/2010 | Chew | G06F 17/2827 707/803 |
| 2011/0016118 A1* | 1/2011 | Edala | G06F 17/30864 707/730 |
| 2017/0083508 A1* | 3/2017 | Dixon | G06F 17/2785 |
| 2018/0107647 A1* | 4/2018 | Ackermann | G06F 17/278 |
| 2018/0107648 A1* | 4/2018 | Ackermann | G06F 17/278 |

OTHER PUBLICATIONS

Bader and Chew, "Enhancing Multilingual Latent Semantic Analysis with Term Alignment Information", Proceedings of the 22nd International Conference on Computational Linguistics (Coling 2008), pp. 49-56 Manchester, Aug. 2008.*

Peter Chew and Jessica Turnley. Understanding Russian information operations using unsupervised multilingual topic modeling. Submitted to the 2017 International Conference on Social Computing, Behavioral-Cultural Modeling & Prediction and Behavior Representation in Modeling and Simulation Jul. 5 (Wed)-8 (Sat), 2017. Under review.

Peter Chew and Jessica Turnley. Rethinking sentiment analysis and "master narratives": an alternative unsupervised text analytics approach using "Information space differences". The Computational Social Science Society of the Americas (CSSSA). https://computationalsocialscience.org/csssa-papers/. Presented at CSSSA conference on Nov. 18, 2016.

Valery Gerasimov. Ценность науки в предвидении (The Value of Science in Foresight). Voenno-Promyshlennyi Kur'er. 2013. http://www.vpk-news.ru/articles/14632. See paragraph [0010] of Specification for consise explanation of the relevance of the information from this reference that is not in the English language.

Jolanta Darczewska. The anatomy of Russian information warfare. Center for Eastern Studies. 2014. https://www.osw.waw.pl/sites/default/files/the_anatomy_of_russian_information_warfare.pdf.

* cited by examiner

FIG. 1

INPUT

Multilingual topic modeling

| Topic | EN weight | RU weight | Weight variance |
|-------|-----------|-----------|-----------------|
| 1 | 0.1064 | 0.1036 | 0.0028 |
| 2 | 0.1267 | 0.0517 | 0.0750 |
| 3 | 0.0975 | 0.1177 | -0.0202 |
| 4 | 0.0864 | 0.1317 | -0.0453 |
| ... | ... | ... | ... |

PART OF OUTPUT

FIG. 2

| Document # | Document Text |
|---|---|
| Document 1 | the man walked the dog |
| Document 2 | the man carried the dog to the park |
| Document 3 | the dog walks to the part |

Construction of matrix

| Term | Document 1 'the man walked the dog' | Document 2 'the man carried the dog to the park' | Document 3 'the dog walks to the park' | Total |
|---|---|---|---|---|
| the | 2 | 3 | 2 | 7 |
| man | 1 | 1 | 0 | 2 |
| walked | 1 | 0 | 0 | 1 |
| dog | 1 | 1 | 1 | 3 |
| carried | 0 | 1 | 0 | 1 |
| to | 0 | 1 | 1 | 2 |
| park | 0 | 1 | 1 | 2 |
| walks | 0 | 0 | 1 | 1 |
| Total | 5 | 8 | 6 | 19 |

FIG. 3

| Document n | Payment to Emanuel Bach 0034X078 Schreberstr. 14, 04109 Leipzig |

$$\log \frac{p(x,y)}{p(x)p(y)} = \log \frac{p(x|y)}{p(x)}$$

| Term | Count in document n | PMI Weight in document n |
|---|---|---|
| 0034X078 | 1 | 4.112 |
| Bach | 1 | 4.012 |
| schreberstr | 1 | 3.233 |
| emanuel | 1 | 3.011 |
| 4109 | 1 | 1.688 |
| leipzig | 1 | 1.381 |
| 14 | 1 | 0.072 |
| payment | 1 | 0.067 |
| to | 1 | 0.044 |

FIG. 4

SAMPLE OUTPUT FOR ONE TOPIC, WITH:
- TOPIC NUMBER (HERE, 3)
- SKEWEDNESS TOWARDS AN INFORMATION SPACE*
- WHEN IN TIME THE TOPIC WAS MOST DISCUSSED
- TERMS MOST REPRESENTATIVE OF THE TOPIC
- DOCUMENTS MOST REPRESENTATIVE OF THE TOPIC

*Here, left on the dial denotes that the topic is more discussed in English, right denotes that it is more discussed in Russian

FIG. 5

DETAILED FLOWCHART OF ENTIRE PROCESS

IDENTIFYING PROPAGANDA IN GLOBAL SOCIAL MEDIA

STATEMENT REGARDING FEDERALLY SPONSORED RESEARCH

This invention was made with Government support under Contract No. N00014-16-P-3020 awarded by the Office of Naval Research to Galisteo Consulting Group, Inc. The U.S. Government has certain rights in this invention.

BACKGROUND OF THE INVENTION

1. Field of the Invention

The present invention relates generally to natural language processing, and in particular to the application of multilingual topic modeling to unstructured multilingual data (the input data). Without preconceptions as to what is important, the invention automatically derives the topics discussed most prevalently in the input data and the topics that most differentiate the discourse in one part of the input data from that in another. Where key differences emerge is where the effects of differing national interests or propaganda may be quickly revealed.

2. Description of the Prior Art

U.S. Pat. No. 8,296,168 describes a system and method for analysis of an opinion expressed in documents with regard to a particular topic, including multilingual opinion analysis.

This system and method presupposes that topics of interest have already been predetermined. It also embodies presuppositions about the relationship between opinion and appropriate surrogates for opinion and intensity thereof. Presuppositions of the second sort are intrinsic in the system and method's use of a 'Words Bank' containing 'a multiplicity of pre-evaluated word scoring functions assigning respective scores to predetermined opinion expressing words and phrases'. All the above presuppositions introduce unavoidable bias into the system, and do not address the important objective of bringing to light cases where the very presence of a topic may say something about opinion or a writer's priorities. Additionally, by the introduction of certain words into the Words Bank which is a necessary component of the system, the system designer or user may inadvertently introduce bias because opinion may be expressed by writers in different ways and using different words.

U.S. Pat. No. 9,471,883 discloses a hybrid human machine learning system and method. This system and method includes scoring techniques for sentiment magnitude scoring of textual passages.

This system and method relies upon the input of a 'group of humans, each human scoring a different attribute associated with an inquiry from the hybrid system'. Appropriate human involvement is required in any system, but the reliance upon humans for 'scoring attributes' (ultimately used for analysis of sentiment in text) both introduces unpredictable bias into the system as a whole, and is expensive because humans have to be compensated. Furthermore, the same group of humans is unlikely to be able to assess sentiment equally well in more than one language. Use of different groups of humans for each language would call into question whether cultural biases are introduced. It is far better if an unbiased machine can handle all the pre-processing so that the human can be brought in only at the end as a user.

U.S. Pat. No. 8,290,961 discloses a technique for information retrieval using enhanced latent semantic analysis. This technique is a fully unsupervised method capable of analyzing multilingual text, and specifically, retrieving documents in one language when a query is submitted in another. It is also capable of generating a topic-by-document matrix in which the relationship between each of a set of multilingual documents taken as input, and each of the emergent principal concepts or topics derived from the input data, is quantified.

While avoiding the intrinsic biases and inefficiencies of the systems and methods identified in paragraphs [0004] and [0006] above, U.S. Pat. No. 8,290,961 does not disclose how to use the topic-by-document matrix to derive anything relating to possible propaganda, sentiment, or opinion. Neither would this be obvious from U.S. Pat. No. 8,290,961, because an extra step is required in which the system must account for DIFFERENCES between subsets of the input data, but still maintaining the overall unsupervised approach and without introducing any systemic biases.

SUMMARY OF THE INVENTION

The present invention is a computer-implemented method for identifying propaganda, and its effects, in global social media. Note that both 'propaganda' and 'social media' here are broadly defined (see Definitions under DETAILED DESCRIPTION OF THE INVENTION).

The key inspiration for this invention came from a non-obvious coupling of two seemingly unrelated concepts: (1), unsupervised multilingual topic extraction of the sort used in U.S. Pat. No. 8,290,961, and (2) the Russian government's strategic military doctrine on 'information warfare' or 'next-generation warfare' articulated, for example, by Valery Gerasimov in 2013 (see references). ('Information warfare', mentioned by Gerasimov as ' информаци ионногс противс борства ', first appears in the seventh paragraph of his article in Russian, not including titles and subtitles as paragraphs.) We draw upon Gerasimov's idea of the 'information space' and further upon ideas put forth by Aleksandr Dugin (a Russian ideologue) and commented upon by Darczewska (see references), in which Russian next-generation warfare seeks first and foremost to control the 'information space' (mentioned as ' разведыв ательнс информ: ционном простр анстве ' in the ninth paragraph of Gerasimov article in Russian, not including titles and subtitles as paragraphs) bounded by use of the Russian language: in other words, to control first and foremost what Russian speakers think. While Russian doctrine was a key part of what inspired the present invention, nothing about the present invention is limited to or specific to analysis of Russian propaganda. The coupling of the concepts mentioned in this paragraph is non-obvious because it takes setting up the unsupervised machine learning techniques in a relatively simple yet very specific way, outlined further under 'DETAILED DESCRIPTION OF THE INVENTION', to harness the ideas of Russian strategic doctrine without introducing external biases and produce actionable output.

The input to the invention is the text of social media 'documents' (also defined below). Up front, the user of the invention specifies a gross subdivision of the input that is of interest to the user. Again, drawing from the ideas of Gerasimov and Dugin, a gross subdivision of the input data might be between Russian-language social media and English-language social media. However, other groupings, including not just two-way but multi-way subdivisions, and subdivisions other than by language, are possible, and are entirely at the discretion of the user. The output of the invention is an ordered list of topics most deserving of a user's attention. The factors that determine how deserving of a user's attention a topic is, are (1) how prevalent that topic is in the source data in any of the subdivisions, and (2) how distinctive that topic is in specific subdivisions of the source data. For example, a topic both widely discussed in Russian and highly distinctive to the Russian 'information space' may be of interest as an emerging propaganda vector, or at very least as something an analyst who is situated outside the Russian information space may wish to know about. However, a topic distinctive to the Russian information space, but only discussed in a couple of social media posts, will be more likely to be immaterial. Such topics will be prioritized lower in the output. By reviewing the output, a human analyst can quickly get an idea of what is most important (statistically)—both the commonalities and the differences between subdivisions—in the input without having to read all the input text.

The following example will serve to illustrate the functioning of the invention and a use thereof. An analyst (the user) wishes to know what propaganda angles may be used by different governments in connection with the 2016 NATO exercises in eastern Europe. A source dataset of 200,000 tweets (Twitter posts), about half of which are in English and half in Russian, is obtained. This source dataset is fed into the invention by the analyst, who also specifies that he wishes to know what differences exist between the English-language and the Russian-language tweets. A list of the top topics discussed in EITHER language is output by the invention, without the user having to have any prior knowledge about this particular dataset. Further, the invention outputs which topics are most skewed towards discussion in either English or Russian. It turns out that that one topic (call it Topic X) most skewed towards discussion in Russian has, as some of its top most representative terms, 'global', 'strike', and the Russian equivalents of those terms. The invention also outputs which documents (here, tweets) are most representative of Topic X. Because the invention has identified to the user that Topic X is skewed towards Russian, the user reviews the Russian-language tweets most representative of Topic X. It turns out that many of these tweets state that NATO is 'preparing a global strike on Russia', an idea not present in the English-language tweets. The invention does not itself draw the conclusion that the prevalence of this idea in the Russian-language tweets is the result of propaganda. Instead, the invention simply flags the topic to the user and tells the user (1) this is a highly prevalent topic, and (2) this topic is much more discussed in Russian than in English. Once this is brought to the attention of the analyst/user, however, he is then in a position to bring analytical thought processes to bear and perhaps draw the conclusion that the idea expressed prevalently in Russian is not an accurate characterization of NATO's 'global strike' capability, and that the large number of tweets expressing this idea in Russian are either the cause or the effect (or both) of propaganda. Further, the analyst may use the difference found here between the English and Russian information spaces to provide early warning of how propaganda may later take hold in the English language.

It is therefore a primary object of the present invention to provide a method for quickly identifying important similarities and differences in large amounts of multilingual text which will significantly streamline the process of analyzing and understanding that text, especially (but not exclusively) where propaganda may be having an influence on linguistically-bounded regions.

It is another object of the present invention to provide a flexible method for identifying propaganda in multilingual text which can easily be adapted to use with input data in different formats (e.g. Twitter with its 140-character limit per post, Facebook where longer posts are allowed, VKontakte in which many posts are in Russian), and specifically to eliminate hindrances for a user in reconfiguring the invention to work with different languages and formats, saving the user of the invention time in its use.

It is a further object of the present invention to provide a flexible method for identifying propaganda in multilingual text which avoids intrinsic biases to the extent possible. By focusing in simply on similarities and differences in the source data, the invention plays to the advantages of unsupervised learning and avoids the need for lists of sentiment-bearing words, human assessment of what constitutes sentiment, opinion, or propaganda and how to measure these, and human intuitions and biases about what is important. The invention also avoids the cost (in labor) of compiling and maintaining such word lists and collections of human assessments and intuitions.

It is still a further object of the present invention to provide a flexible method for identifying propaganda in multilingual text which can deal with unstructured text; the invention does not make any presumptions about which human language or character set (e.g. English, French, Russian) is used to encode the unstructured text.

It is still a further object of the present invention to provide a flexible method for identifying propaganda in multilingual text which produces reliable output, where reliability is measured by accuracy in clustering together documents which are translations of one another (i.e., in different languages, but known to be on the same topics).

It is still a further object of the present invention to provide a flexible method for identifying propaganda in multilingual text which, after completing the analysis, supports the generation of reports showing the top most important topics, the terms and documents most representative of those topics, the geographic areas (in the case of geo-tagged documents) where the topics were most discussed, the points in time (in the case of timestamped documents) when the topics were most discussed, and the cases in which topics are most skewed towards one or another 'information space'.

These and other objects of the present invention will become apparent to those skilled in this art upon reading the accompanying description, drawings, and claims set forth herein.

BRIEF DESCRIPTION OF THE DRAWINGS

Non-limiting and non-exhaustive embodiments of the invention are described with reference to the following figures.

DETAILED DESCRIPTION OF THE INVENTION

1. Definitions

Key terms used herein are defined below, and illustrated further in the Drawings.

Figure 1:
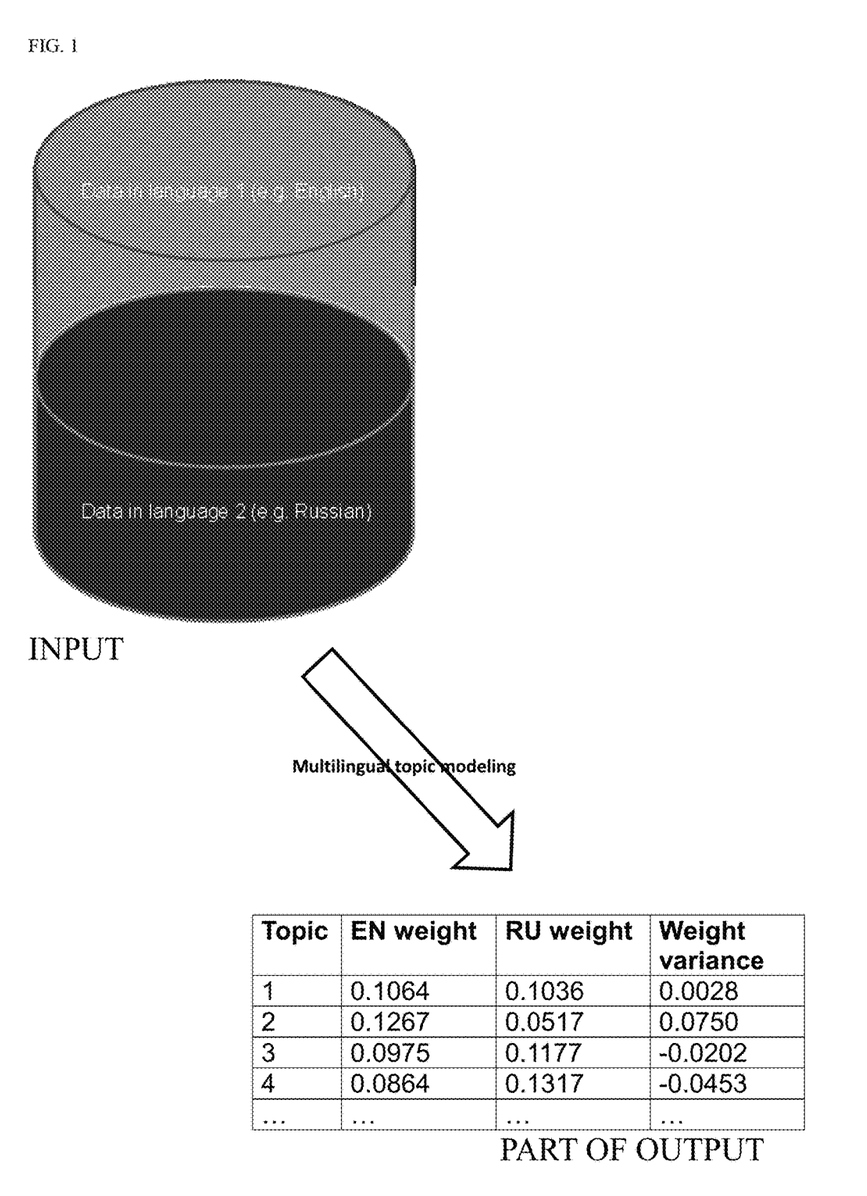
FIG. 1 shows an overview of the improved process used for identifying propaganda in multilingual text.

'Dataset' as used herein shall mean an arbitrary-sized collection of social media documents. In each use of the invention, a dataset is provided by the user as input, as illustrated in FIG. 1 of the Drawings.

'Social media' as used very broadly herein shall mean any text created in any language by human beings to convey meaning, and capable of being digitized, including but not limited to: collections of Twitter posts, collections of Facebook posts, collections of VKontakte (a Russian-based social media platform) posts, collections of Word documents, and collections of transcripts of speeches.

'Document' as used herein shall mean a single coherent chunk of text within the social media, including but not limited to: individual Twitter posts, individual Facebook posts, individual VKontakte posts, individual Word documents, or individual transcripts of speeches.

'Term' as used herein shall mean an atomic piece of text, containing its own meaning, within each document. For the vast majority of human languages (including English), terms include but are not limited to individual words separated by white space or regular expressions non-word characters.

'Topic' as used herein shall have the meaning familiar to one skilled in the art of unsupervised matrix factorization as applied to text analytics (for example, Latent Semantic Analysis): a soft cluster of the input data wherein documents and terms that share similar meanings are grouped together. In Latent Semantic Analysis, each topic corresponds to one of the principal components of the singular decomposition.

'Propaganda' as used broadly herein shall mean ideas that take hold in a group of people, whether because those ideas have been deliberately propagated by a national government, ideologues, religious leaders, or other thought leaders, or simply because those ideas are of more intrinsic interest to the group of people in which the ideas take hold. 'Propaganda' here is also used without regard to the truth or falsehood of the ideas: some propaganda in the sense used here may be based upon facts, while other propaganda may be based on lies or distortion of facts. The usefulness of the present invention is simply in quickly and reliably identifying instances of propaganda based solely on statistics of word usage, avoiding bias in doing so, and leaving judgments on the truth or falsehood of the propaganda, and judgements and conclusions on what caused the ideas to take hold, to the human user of the invention.

2. Best Mode of the Invention

FIG. 1 shows an overview of the best mode contemplated by the inventor of the method for identifying propaganda in multilingual text according to the concepts of the present invention.

3. How to Make the Invention

Figure 2:
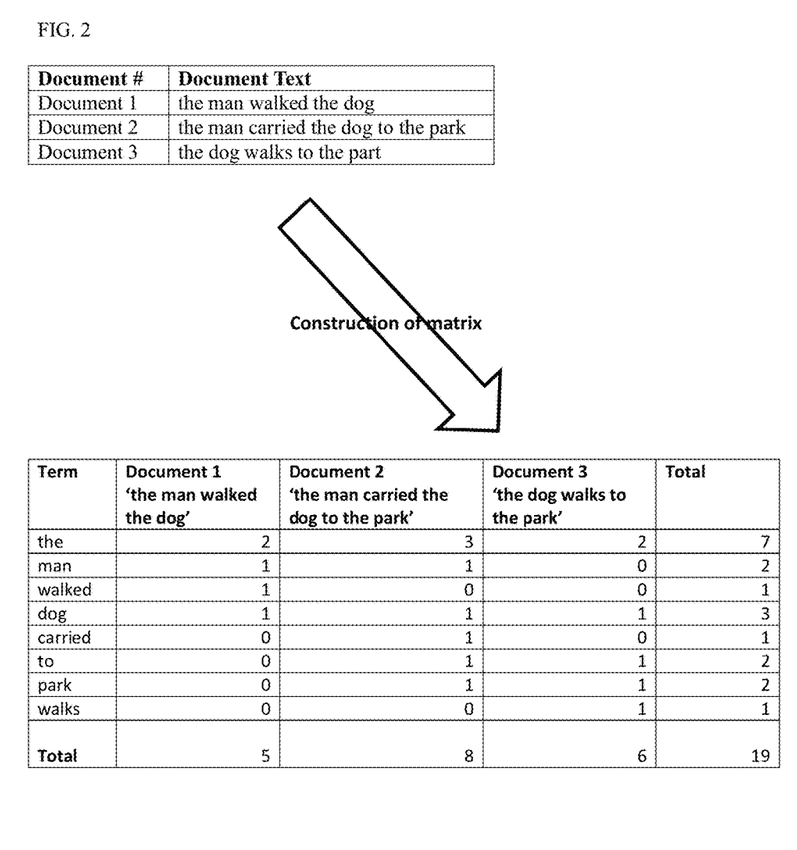
FIG. 2 shows how a term-by-document matrix is derived from social media documents.

As can be amply seen from FIG. 2, the process begins by construction of a term-by-document matrix from the input dataset consisting of raw social media documents. In the input data table, each document may be in a separate row. The output matrix encodes how many times each distinct term occurs in each document.

For extraction of words from a document (consisting of unstructured text), a text tokenizer is required. An example of a preferred method for text tokenization would be the regular expressions Regex.Split method used in conjunction with "\w" (the non-word character delimiter). This method can be applied to virtually any human language encoded in any Unicode script. If the source dataset is in a Microsoft SQL Server 2005 or later database (available from Microsoft Corporation, Redmond, Wash.), then a highly efficient way of tokenizing text fields is to implement the regular expressions method above within a Common Language Runtime database function which can then be referenced within an SQL (Structured Query Language) database query. Within other database management systems, there are likely to be equivalent methods for text tokenization. The text tokenizer converts text within documents as shown in FIG. 2 to a format where each word within the text is a separate feature; the latter format is highly amenable to further data manipulation.

Figure 3:
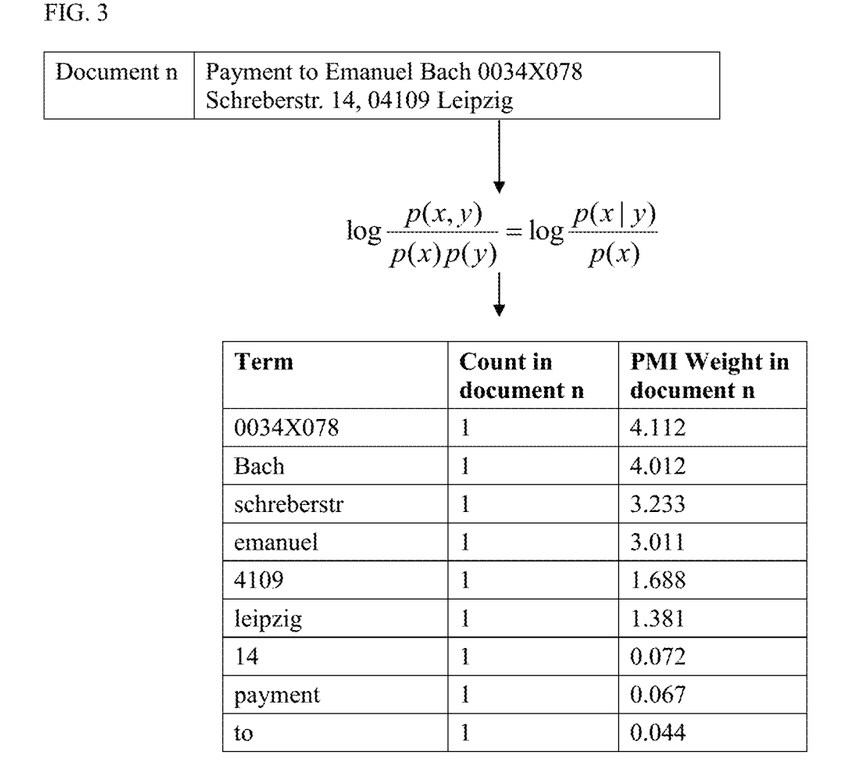
FIG. 3 shows how terms within documents may be weighted using the pointwise mutual information measure, rendering the document (in geometric terms) as a vector in multidimensional space.
Figure 4:
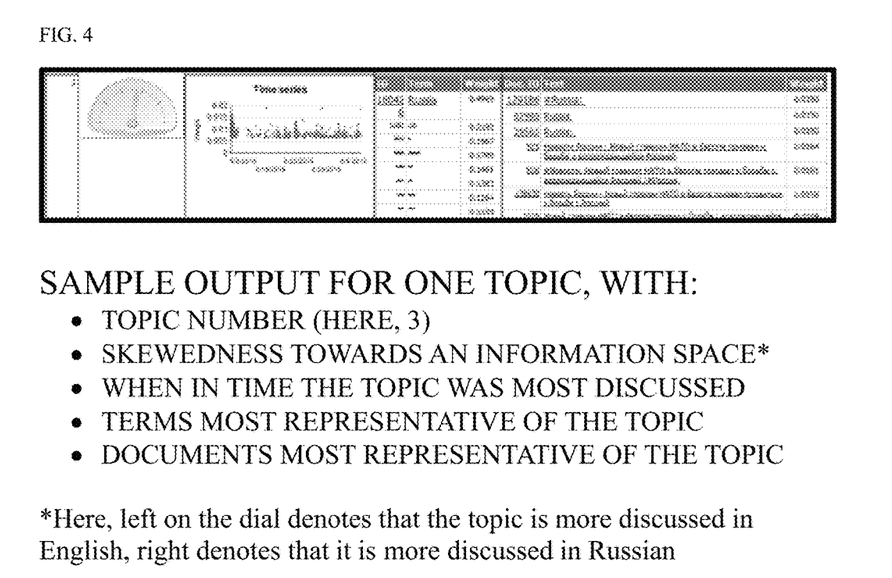
FIG. 4 shows sample output of the invention, for one topic, including (from left to right) the topic number (this is the third most important topic derived from the source dataset), the skewedness of the topic towards the English or Russian information space, a time-series chart showing when the topic was most discussed in the source data, a list of the top terms characterizing the topic in descending order of weight within the topic, and a list of documents characterizing the topic in descending order of weight within the topic. By reviewing a single report listing all topics, each with its associated information, the user can quickly gain a sense of what topics are statistically most prevalent in the source data, which topics are common to different information spaces, and which topics may most reflect propaganda.
Figure 5:
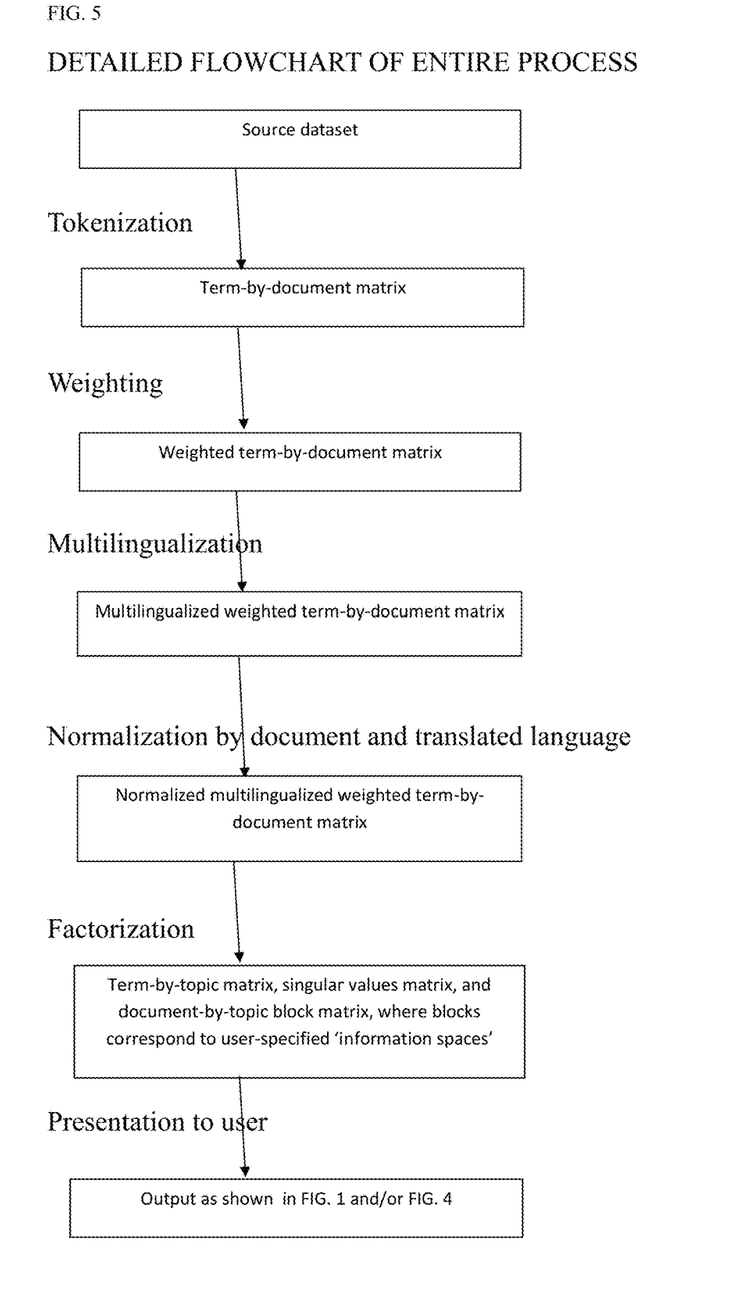
FIG. 5 shows the entire process, step by step, from input of the source dataset to output of the information that enables a user quickly to make sense of the key information in the source dataset and identify, via differences between the information spaces, the cases where propaganda may be having an effect.

The method for identifying propaganda in multilingual text incorporates the use of a weighting scheme to measure the distinctiveness of particular terms in particular documents. A preferred weighting scheme would be based on information theory and an example would be Pointwise Mutual Information, which can be defined as the probability of term i in (or conditional upon) document j, divided by the probability of term i occurring in the entire population. In effect, this weighting scheme calculates how much more likely a term is to occur in conjunction with a particular document than may be expected on the basis of chance. A formula for Pointwise Mutual Information is shown in FIG. 3, along with sample results of applying this weighting to terms from tokenized text. The most distinctive terms for the document are assigned higher weightings, while features which are non-distinctive are assigned lower weightings. Use of a weighting scheme in this fashion is resilient to typographical and other encoding errors in the source data, and will automatically recognize which terms are most distinguishing within a particular dataset, without any a priori knowledge of the characteristics of the dataset. This is a key reason that the present invention is highly generalizable to different datasets.

Once the terms are extracted and weighting is assigned, the method for identifying propaganda in multilingual text incorporates a step to 'multilingualize' the matrix obtained from [0036]. In the best mode of the invention, this step is accomplished by pre-multiplying the matrix from [0036] by a square term-by-term translation matrix which can be the same regardless of the source dataset from which the matrix in [0036] was derived. In the best mode of the invention, the translation matrix is constructed through a process which will be familiar to one skilled in the art of statistical machine translation. From a parallel corpus, terms are automatically aligned by reference to the maximization of mutual information. From what is empirically observed from term alignment, the translation matrix then simply encodes the probability that given a term in one language, that term aligns with a given term in another. If both source and target languages are the same, then each term aligns with itself with probability 1, meaning that the translation matrix is the identity matrix. By pre-multiplying the matrix from [0036] with the translation matrix, a multilingualized matrix is obtained in which the weighted values from [0036] are spread across multiple languages.

In the best mode of the invention, the matrix product which results from [0037] can be normalized by document and language. The matrix from [0037] can be thought of as a collection of document vectors (the columns in the term-by-document matrix). As a result of the multilingualization step, the matrix from [0037] can also be thought of as a block matrix in which there is one block per language. The multilingualization step fills in blocks, so that for example an English-language document has non-empty blocks for, say, Russian, French, and other languages represented in the translation matrix. Each document vector therefore is a stack of language-specific subvectors, each with its own magnitude. In the best mode of the invention, via a process well-known to those skilled in the art of matrix computations, each of these subvectors within the overall matrix is normalized via L2 normalization to be of unit length. This transforms the overall matrix into a matrix normalized by document and translation language, which is then factorized as described in [0039].

Once a multilingualized matrix is obtained from [0037] or [0038], the next step is to perform topic extraction. In the best mode of the invention, this is accomplished by factorizing the multilingualized, weighted matrix from [0038] using Singular Value Decomposition (SVD). One skilled in the art of linear algebra will recognize that as output from the factorization, SVD yields three matrices: a dense term-by-topic matrix U, a diagonal singular values matrix S, and a dense topic-by-document matrix V. U is of size k by i, S of size k by k, and V of size j by k, where i is the number of distinct terms in the source dataset plus any additional terms that resulted from multilingualization, j is the number of documents in the source dataset, and k is the number of topics in the SVD, not greater than the smaller of i and j. k may be less than the smaller of i and j if a truncated SVD is computed. Matrix S implicitly orders the topics; the larger the singular value for a topic, the more important it is in the source dataset. Matrices U and V encode the importance of each topic to each term and document respectively.

To assess effects of propaganda or other specific national or group interests, in the best mode of the invention, matrix V—the topic-by-document matrix—is subdivided into two or more blocks, in a way which will be familiar to one skilled in the art of matrix computations. What the subdivision is based on will be determined by the user of the method. For example, to determine the differences in effect on the Russian-language and English-language 'information spaces', using the idea from Russian strategic thinking, the user might subdivide matrix V into one block containing the columns corresponding to all the Russian-language social media documents, and another containing the columns corresponding to all the English-language social media documents. In the best mode of the invention, the weight each block contributes to each topic is computed by summing the squared values in the block and topic. These weights can be collected into a k by 1 matrix, where k is the number of topics and 1 the number of subdivisions or blocks. The k by 1 matrix shows which topics are more strongly weighted towards one or another subdivision (e.g. language). By calculating the variances within this matrix by topic, one can arrive at a RELATIVE ranking of the most important topics in the source dataset by subdivision (e.g. language). This shows, in effect, which of the most frequently discussed topics have taken hold more in one information space than another, possibly as a result of propaganda or other group or national interest. This matrix can quickly be reviewed by an analyst to focus his or her time most effectively on anomalies that may most warrant further explanation or investigation.

The processes explained above may constitute computer-executable instructions (e.g. software, firmware) embodied or stored within a machine-readable storage medium, that when executed by a machine will cause the machine (e.g. computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g. read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant arts will recognize.

4. How to Use the Invention

The method for identifying propaganda in multilingual text is designed to be 'unsupervised', meaning that very little user intervention is necessary. This in turn leads to a significant savings in labor compared to existing methods. If the method is implemented as computer-executable instructions embodied or stored within a machine-readable storage medium, the user need simply specify (e.g. through a user interface) which source dataset is to be used as input, and what subgroups the user is interested in comparing, and the machine will output results indicating key topics and areas in which propaganda or other items of national or group interest are most likely to have taken hold. The user need then simply review the output of the invention and use it to focus his or her attention on key aspects of the source dataset that most merit further investigation, explanation, and analysis.

The problems addressed by the method for identifying propaganda in multilingual text are many as can be easily seen by those skilled in the art. The method for identifying propaganda in multilingual text is not restricted to working with data in a particular format or even text in a particular human language. It is not limited in terms of the number or type of documents and terms in the source dataset. It is not limited by size of dataset, and in fact is anticipated to provide increasingly greater efficiencies and savings with larger datasets. It avoids the need for specifying heuristics particular to individual datasets. Through the connections with statistics and information theory, it can be relied upon to produce results which may even exceed the accuracy of a human, since the algorithm is able to gain a 'global' picture of similarities between documents, even across language boundaries, that a human could not achieve for large datasets. The present invention can dramatically reduce the amount of labor, and therefore the costs, associated with identifying propaganda in multilingual text, particularly on a large scale. Since analysis of text is a function performed in many different fields, the present invention has widespread uses.

Thus it will be appreciated by those skilled in the art that the present invention is not restricted to the particular preferred embodiments described with reference to the drawings, and that variations may be made therein without departing from the scope of the present invention as defined in the appended claims and equivalents thereof.

What is claimed is:

1. A computer implemented method for identifying propaganda, wherein a computer has a source dataset stored thereon, comprising:
    the computer tokenizing each document in the source dataset;
    the computer generating a term-by-document matrix;
    the computer applying weights to the term-by-document matrix to generate a weighted term-by-document matrix;
    the computer performing a matrix multiplication of a translation matrix and the weighted term-by-document matrix to generate a multilingualized weighted matrix;
    the computer factorizing the multilingualized weighted matrix to generate an ordered list of topics and a topic-by-document block matrix;
    the computer calculating a contribution per user-specified grouping within the source dataset to each topic within the ordered list of topics; and
    the computer generating output enabling significant patterns, trends, and differences between groupings to be identified;
    wherein the tokenization, generating of a matrix, applying weights, matrix multiplication, factorizing, calculating, and generating of output are performed regardless of the number, type, or size of documents, regardless of the number or type of terms associated with each document, and regardless of the provenance of the dataset.

2. A computer implemented method of claim 1, wherein tokenizing documents comprises:
    using a Regex.Split regular expressions function in conjunction with a non-word delimiter \w; and
    listing all unique terms within each document and numbers of occurrences of the terms within each document.

3. A computer implemented method of claim 1, wherein generating a term-by-document matrix comprises:
    listing unique documents along one axis of the matrix;
    listing unique terms along another axis of the matrix; and
    populating the matrix with non-zero values recording a number of times particular terms occur in conjunction with particular documents.

4. A computer implemented method of claim 1, wherein applying weights to the term-by-document matrix comprises:
    calculating a distinctiveness weighting by measuring pointwise mutual information between respective documents and terms which occur in conjunction with one another; and
    creating a weighted term-by-document matrix identical to the term-by-document matrix except that values in the weighted term-by-document matrix are the distinctiveness weightings instead of a number of times particular terms occur in conjunction with particular documents.

5. A computer implemented method of claim 1, wherein the matrix multiplication of a translation matrix and the term-by-document matrix comprises:
    aligning terms within a multilingual parallel corpus;
    listing a count of alignments of each distinct pair of terms that align;
    for each pair (t1, t2) of aligned terms, expressing the count as a probability conditional upon t1;
    populating the translation matrix with non-zero values recording the probabilities conditional upon t1.

6. A computer implemented method of claim 1, wherein performing a matrix multiplication of the translation matrix and the term-by-document matrix comprises:
    computing a first new block matrix resulting from the product of the translation matrix and the term-by-document matrix, such that there is a single block per translated language;
    deriving a second new matrix from the first new matrix by computing an L2 normalization of the first new matrix such that each document vector within a single block of the second new matrix has a magnitude equal to that of every other document vector within a single block of the second new matrix.

7. A computer implemented method of claim 1, wherein factorizing the weighted term-by-document matrix comprises:
    performing a truncated or full singular value decomposition on the weighted term-by-document matrix;
    generating a singular values matrix as an output of the singular value decomposition;
    generating a term-by-topic matrix as an output of the singular value decomposition; and
    generating a topic-by-document block matrix, in which each block corresponds to one of the user-specified groupings, as an output of the singular value decomposition.

8. A computer implemented method of claim 1, wherein generating output comprises:
    creating a report in which each section corresponds to one of the topics from the singular value decomposition;
    creating a list in each section of the report of top most representative terms, based on highest per-topic values in the term-by-topic matrix; and
    creating a list in each section of the report of top most representative documents, based on highest per-topic values in the topic-by-document block matrix.

9. A computer implemented method of claim 1, wherein generating output comprises:
    creating a report in which each section corresponds to one of the topics from the singular value decomposition;
    calculating for each of the topics from the singular value decomposition a difference in magnitude per block of the topic-by-document block matrix;
    displaying a list of topics ordered by the difference in magnitude per block.

10. A computer implemented method for identifying propaganda, wherein a computer has a source dataset stored thereon, comprising:

the computer tokenizing each document in the source dataset;

the computer generating a term-by-document matrix;

the computer applying weights to the term-by-document matrix to generate a weighted term-by-document matrix;

the computer performing a matrix multiplication of a translation matrix and the weighted term-by-document matrix to generate a multilingualized weighted matrix;

the computer factorizing the multilingualized weighted matrix to generate an ordered list of topics and a topic-by-document block matrix; and the computer calculating a contribution per user-specified grouping within the source dataset to each topic within the ordered list of topics;

wherein the tokenization, generating of a matrix, applying weights, matrix multiplication, factorizing, calculating, and generating of output are performed regardless of the number, type, or size of documents, regardless of the number or type of terms associated with each document, and regardless of the provenance of the dataset.

11. A computer implemented method of claim 10, wherein tokenizing documents comprises:

using a Regex.Split regular expressions function in conjunction with a non-word delimiter \w; and listing all unique terms within each document and numbers of occurrences of the terms within each document.

12. A computer implemented method of claim 10, wherein generating a term-by-document matrix comprises:

listing unique documents along one axis of the matrix;

listing unique terms along another axis of the matrix; and populating the matrix with non-zero values recording a number of times particular terms occur in conjunction with particular documents.

13. A computer implemented method of claim 10, wherein applying weights to the term-by-document matrix comprises:

calculating a distinctiveness weighting by measuring pointwise mutual information between respective documents and terms which occur in conjunction with one another; and creating a weighted term-by-document matrix identical to the term-by-document matrix except that values in the weighted term-by-document matrix are the distinctiveness weightings instead of a number of times particular terms occur in conjunction with particular documents.

14. A computer implemented method of claim 10, wherein performing a matrix multiplication of a translation matrix and the term-by-document matrix comprises:

aligning terms within a multilingual parallel corpus;

listing a count of alignments of each distinct pair of terms that align;

for each pair (t1, t2) of aligned terms, expressing the count as a probability conditional upon t1;

populating the translation matrix with non-zero values recording the probabilities conditional upon t1.

15. A computer implemented method of claim 10, wherein performing a matrix multiplication of the translation matrix and the term-by-document matrix comprises:

computing a first new block matrix resulting from the product of the translation matrix and the term-by-document matrix, such that there is a single block per translated language.

16. A computer implemented method of claim 15, wherein performing a matrix multiplication of the translation matrix and the term-by-document matrix further comprises:

deriving a second new matrix from the first new matrix by computing an L2 normalization of the first new matrix such that each document vector within a single block of the second new matrix has a magnitude equal to that of every other document vector within a single block of the second new matrix.

17. A computer implemented method of claim 10, wherein factorizing the weighted term-by-document matrix comprises:

performing a truncated or full singular value decomposition on the weighted term-by-document matrix; and generating a singular values matrix as an output of the singular value decomposition;

generating a term-by-topic matrix as an output of the singular value decomposition; and generating a topic-by-document block matrix, in which each block corresponds to one of the user-specified groupings, as an output of the singular value decomposition.

18. A computer implemented method of claim 10, wherein calculating a contribution per user-specified grouping within the source dataset to each topic within the ordered list of topics comprises:

calculating a magnitude per block and per topic in the document-by-topic block matrix by summing squared values within respective blocks and topics of the document-by-topic block matrix;

calculating for each topic a difference in the magnitude between blocks.

19. A method for identifying propaganda, comprising the steps of:

tokenizing each document in a source dataset;

generating a term-by-document matrix;

applying weights to the term-by-document matrix to generate a weighted term-by-document matrix;

performing a matrix multiplication of the translation matrix and the term-by-document matrix to generate a multilingualized weighted matrix;

factorizing the multilingualized weighted term-by-document matrix to generate an ordered list of topics and a topic-by-document matrix; and generating output so as to transform the dataset into useful actionable information enabling identification of documents or groups of documents that merit closer scrutiny;

wherein the tokenization, generating of a matrix, applying weights, matrix multiplication, factorizing, calculating, and generating of output are performed regardless of the number, type, or size of documents, regardless of the number or type of terms associated with each document, and regardless of the provenance of the dataset.

20. The method for identifying propaganda of claim 19, further providing instructions that, when executed by a computer, will cause the computer to perform further operations, comprising:

extracting features of each document in a financial dataset;

generating a term-by-document matrix;

applying weights to the term-by-document matrix to generate a weighted term-by-document matrix;

factorizing the weighted term-by-document matrix;

generating output enabling propaganda or indicators of national interests to be identified.

* * * * *